(12) United States Patent
Ng et al.

(10) Patent No.: US 6,637,905 B1
(45) Date of Patent: Oct. 28, 2003

(54) METHOD AND SYSTEM FOR PROVIDING BACKLIGHTING UTILIZING A LUMINESCENT IMPREGNATED MATERIAL

(75) Inventors: Kee Yean Ng, Pg (MY); Wen Ya Ou, Penang (MY)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/255,208

(22) Filed: Sep. 26, 2002

(51) Int. Cl.[7] .................................................. F21V 7/04
(52) U.S. Cl. .......................................... 362/31; 362/84
(58) Field of Search ...................................... 362/84, 31

(56) References Cited

U.S. PATENT DOCUMENTS

| | | | | |
|---|---|---|---|---|
| 5,640,792 A | * | 6/1997 | Smith et al. | 362/31 |
| 6,210,012 B1 | * | 4/2001 | Broer | 362/84 |
| 6,352,350 B1 | * | 3/2002 | Ma | 362/19 |
| 6,480,247 B1 | * | 11/2002 | Moon | 362/65 |
| 6,536,914 B2 | * | 3/2003 | Hoelen et al. | 362/231 |

* cited by examiner

*Primary Examiner*—Laura K. Tso

(57) ABSTRACT

An apparatus is directed to providing backlighting utilizing luminescent impregnated material. The apparatus includes a radiation source providing a first radiation and a filter layer optically coupled to the radiation source including a luminescent material designed to absorb the first radiation, and emit one or more radiations. The apparatus further includes a light guide optically coupled to the filter layer and designed to receive the emitted radiation and reflect at least a portion of the emitted radiation. The apparatus additionally includes a display layer optically coupled to the light guide and designed to receive the reflected radiation. The system provides means for providing a first radiation, means for absorbing the first radiation, means for emitting one or more radiations based on the absorbed first radiation, means for receiving the emitted radiation, means for reflecting the emitted radiation, and means for receiving the reflected emitted radiation.

20 Claims, 2 Drawing Sheets

METHOD AND SYSTEM FOR PROVIDING BACKLIGHTING UTILIZING A LUMINESCENT IMPREGNATED MATERIAL

FIELD OF THE INVENTION

In general, the invention relates to converting a color output of a light emission source. More specifically, the invention relates to a method and system for providing backlighting utilizing a luminescent impregnated material.

BACKGROUND OF THE INVENTION

Light emitting diodes (LEDs) are increasingly used as a light source for backlighting applications, such as for example, in conjunction with light guides or light pipes. FIG. 1 details an existing backlighting device 100 currently in use within the industry. In FIG. 1, a light source 110, implemented as an LED, provides uniform illumination to the top surface of a light guide 120, also implemented and referred to as a light pipe, where a legend 130, also implemented and referred to as liquid crystal display (LCD), is placed over the light guide 120 thereby rendering the legend 130 or LCD display legible.

The light guide 120 is optically coupled to the light source 110 and serves to channel the light along its entire length and is designed such that light is reflected up and out as shown by the arrows emitting in an upwards direction. The color of the backlighting can be modified by changing the light source 110 to a different color, such as by changing the LED. If a blue illumination is needed, a blue LED is used for the light source 110. Likewise, a red LED is used if red illumination is needed for the light source 110.

A type of LED increasingly utilized in backlighting is a white LED device. The white LED device, as the name implies, emits radiation that appears white to an observer. In one example, this is achieved by combining an LED, which emits a blue light, and a phosphor such as Cerium activated Yttrium Aluminium Garnet ($Y_3Al_5O_{12}:Ce^{3+}$). The blue LED emits a first radiation typically with peak wavelength of 460 to 480 nanometer (nm). The phosphor partially absorbs the blue radiation and reemits a second broadband radiation with peak wavelength of 560 to 580 nm. The combination, also referred to as a composite radiation, of the second yellow radiation together with the unabsorbed first radiation gives a white appearance to the observer.

FIG. 2 details a typical design of a throughhole package assembly 200 presently utilized within the industry and referred to as an LED lamp. The blue LED 210 is placed inside a receptacle 220, such as reflector cup, which forms one part of electrical element 230. A bond wire 240 is made between LED 210 and electrical element 250. The phosphor layer 260 is placed to surround LED 210, and this formation is referred to as potting. The package assembly 200 is encapsulated within a transparent epoxy 270 that provides protection. As an example, Nichia Chemical Industries produces such a lamp.

FIG. 3 details a typical design of a backlighting device 300 utilizing a white LED lamp, such as package assembly 200 of FIG. 2 above. The design of backlighting device 300 is similar to the design of backlighting device 100 of FIG. 1. However, the light source 310 of FIG. 3 is now implemented as a white LED lamp. Because a white LED lamp is used as the light source 310, the top surface of the light guide will be illuminated with a white color.

Current industry practices, while manufacturing usable backlighting devices, do not address several issues. First, in order to change backlighting color, current industry devices require a different LED device to be used. This is due to the color emitted by an LED device being a function of the type of LED and type of phosphor utilized. For example, a blue LED device produces blue light, a green LED device produces green light, and white LED device produces white light.

Unfortunately, this means that a backlighting manufacturer has to purchase and keep in inventory many different color types of LED devices to cater to differing color requirements of his customers. Phosphor-incorporated LED devices are inherently expensive due to their more complicated manufacturing process, an example of which was detailed in FIG. 2 above, and therefore the inventory cost of stocking these devices is high.

Second and again referring to FIG. 2, potting the phosphor layer 260 near the LED 210 also subjects the phosphor layer 260 to heat as LED 210 heats up during normal operation. This heating of phosphor layer 260 may cause the quantum efficiency of phosphor layer 260 to reduce, thereby lowering the light output.

Third, the emitted color of an LED changes as a function of the forward drive current. It is well known within the industry that blue, cyan and green LEDs, based on a Gallium Nitride composition, have color variations when comparing emitted color output based on the LEDs being driven at 5 milliampere (mA) and 20 mA. Within the industry, LED devices are typically tested and categorized by brightness and color at a test current of 20 mA. Therefore, a user of an LED must consider color shifting if he desires to use a different drive current.

Fourth, a user may want a certain special color that is not available in any LED device. Currently, as mentioned above, a user must rely on available manufacturing inventory for backlight color availability. It would be desirable, therefore, to provide a method and system that would overcome these and other disadvantages.

SUMMARY OF THE INVENTION

The present invention is directed to a system and method for providing backlighting utilizing a luminescent impregnated material. The invention allows a user to determine and implement a desired radiation output, referred to as a light color, independent of a radiation input, also referred to as a light color, or source of the radiation input within a backlighting device.

One aspect of the invention provides a backlighting apparatus including a radiation source providing a first radiation. The apparatus further includes a filter layer optically coupled to the radiation source including a luminescent material and designed to absorb the first radiation, in whole or in part, and emit one radiation or a composite radiation. The apparatus additionally includes a light guide optically coupled to the filter layer and designed to receive the emitted radiation or composite radiation and reflect at least a portion of the emitted radiation or composite radiation. The apparatus further includes a display layer optically coupled to the light guide and designed to receive the reflected radiation or composite radiation and provide backlighting.

Another aspect of the invention provides a method for providing backlighting by providing a first radiation, and absorbing the first radiation, in whole or in part. The method further provides for emitting a radiation or composite radiation based on the absorbed first radiation. The method additionally provides for receiving the emitted radiation or the composite radiation and reflecting at least a portion of the emitted radiation or the composite radiation. The method further provides for receiving the reflected emitted radiation or the reflected composite radiation in a display layer.

In accordance with another aspect of the invention, a system for providing a backlighting system is provided. The system includes means for providing a first radiation. The system further includes means for absorbing the first radiation, in whole or in part. Means for emitting one or more radiations, wherein the emitted radiation or composite radiation is based on the absorbed first radiation is provided. Means for receiving the emitted radiation or composite radiation and means for reflecting the emitted radiation or composite radiation is also provided. The system additionally includes means for receiving the reflected emitted radiation or composite radiation.

The present invention provides numerous advantages over current industry practices. A user needing a wide variety of color in his product will gain from such a design flexibility by using a phosphor impregnated layer device. In one embodiment, a user would need only blue LEDs. Blue LED devices are much cheaper than those built with phosphor incorporated within. That is, the need would not exist to purchase different types of LED devices which have a light-conversion-phosphor-layer built into the device. With the appropriate phosphor impregnated layer device, composite colors can be easily obtained.

Additionally, locating the phosphor layer away from the LED, which heats up during device operation, results in the phosphor not suffering from degradation due to thermal effects. Therefore, light output is more stable.

Further, an LED device built with phosphor incorporated inside will exhibit color variations with drive current, as discussed above. Such devices are typically 'tested' at 20 mA. However, 'use' drive current may not be at 20 mA. It is not always possible to have the devices tested to the 'use' drive current as LED manufacturers may be reluctant to do so due to economic reasons. Therefore, unexpected colors may be obtained if the 'tested' and 'use' drive currents are different.

The present invention allows for an appropriate phosphor impregnated layer device to be matched to the light source at the different drive current to yield the necessary color. Thus, a user of such devices need not be dependent on the LED manufacturer to test the device to the 'use' drive current.

Finally, by the clever use of matching phosphors, a manufacturer can create a niche color for his products. The color may otherwise not be available in LED devices.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Throughout the specification, and in the claims, the term "connected" means a direct physical or optical connection between the things that are connected, without any intermediate devices. The term "coupled" means either a direct physical or optical connection between the things that are connected or an indirect connection through one or more passive or active intermediary devices.

The present invention relates to converting a color output of a light emission source and more particularly to providing backlighting utilizing a luminescent impregnated material. The present invention allows a user to implement a determined backlighting color by providing a light source and luminescent filter, that when utilized as provided for below, results in the user determined backlighting color.

Illustrative Backlighting Device

Figure 4:
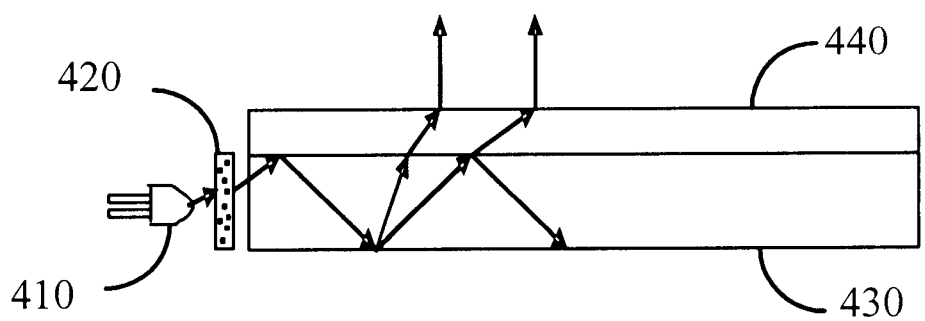
FIG. 4 is a schematic diagram illustrating a backlighting device according to an embodiment of the present invention.

FIG. 4 is a schematic diagram illustrating a backlighting device 400 according to an embodiment of the present invention. FIG. 4 details an embodiment of a system for producing a determined backlighting radiation, in accordance with the present invention. Backlighting device 400 includes a light source 410, a phosphor impregnated layer 420, a light guide 430, and a legend 440.

Figure 1:
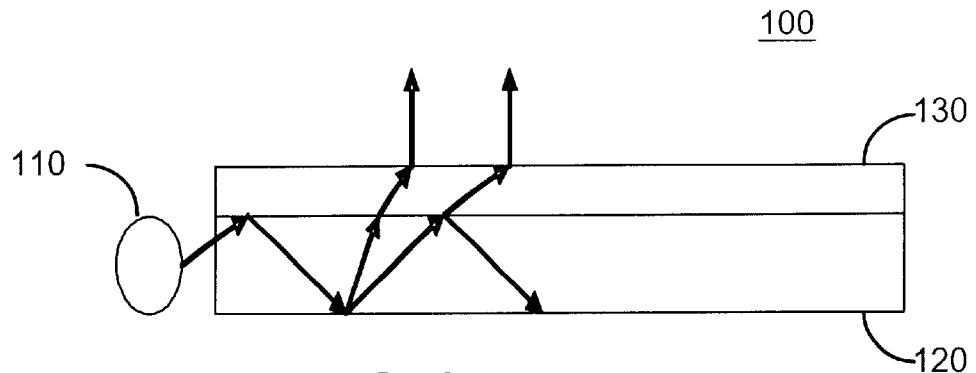
FIG. 1 is a schematic diagram illustrating a conventional backlighting device.
Figure 2:
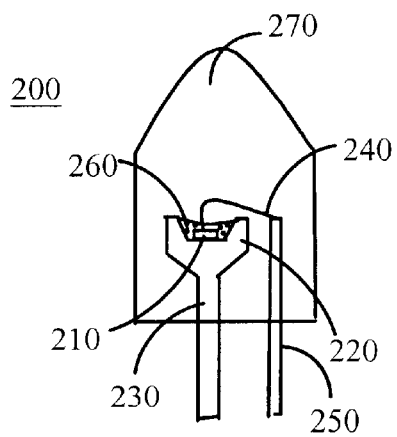
FIG. 2 is a schematic diagram illustrating a conventional throughhole package assembly.
Figure 3:
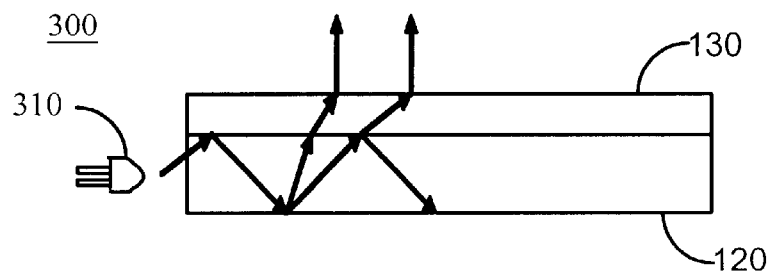
FIG. 3 is a schematic diagram illustrating another conventional backlighting device.

In one embodiment, light source 410, also referred to as a light emitting diode (LED) device, is implement utilizing a throughhole package as detailed in FIG. 2 above. In this embodiment, light source 410 is located at one end of light guide 430, also referred to as a light pipe. Light source 410 emits a first radiation, also referred to as a light color. Phosphor impregnated layer 420 is located between light source 410 and light guide 430. Phosphor impregnated layer 420 is optically coupled to light source 410 such that phosphor impregnated layer 420 receives almost all of the first radiation emitted from the light source 410. Phosphor impregnated layer 420 is optically coupled to light guide 430 as well.

In operation, some radiation will be absorbed by the phosphor within phosphor impregnated layer 420 and converted to a second radiation. In one embodiment, both the second radiation and the unabsorbed portion of the first radiation combine to form a composite radiation, also referred to as a composite color. Subsequently, the composite radiation is directed into light guide 430. In another embodiment and described below, the first radiation is completely absorbed. In this embodiment, the second radiation is directed into light guide 430.

In yet another embodiment, light source 410 represents multiple LEDs. In this embodiment the first radiation represents the sum of the radiations emitted from the LEDs. In another embodiment, phosphor impregnated layer 420 is manufactured in various configurations allowing the user to adjust the direction of emission of the radiation, such as, for example a concave configuration, a convex configuration, and any other configuration that enables adjustment of the aiming of radiation.

In another embodiment, phosphor impregnated layer 420 is implemented as a layer of phosphor material overlying an optically transparent material. In this embodiment, the first radiation absorption and the second radiation or composite radiation emissions function as described above.

A uniform illumination of the composite/second radiation, as shown in FIG. 4 by the arrows, is obtained through subsequent reflections and refractions within light guide 430. In one embodiment, light guide 430 includes reflectors positioned to provide a uniform area of radiation reflection matching a user determined intensity. In an example, light guide 430 is implemented as a light pipe manufactured from polycarbonate and including dot patterned reflectors located as to provide the required light intensity to legend 440.

The composite/second radiation emits in an upwards direction, by design, to the top surface and can be utilized as backlighting for legend 440. In one example, legend 440 is implemented as a liquid crystal display (LCD).

A suitable material for making a phosphor impregnated filter is optically clear silicone. An appropriate amount of phosphor can be easily mixed into liquid silicone and the mixture dispensed or spun into a thin layer of uniform thickness, and then cured. The phosphor impregnated layer can then be cut to size or the required size made during the dispensing or spinning process. In addition to silicone, phosphor can also be impregnated into optically clear plastic materials such as acrylic, polycarbonate, epoxy based materials, and any other materials having similar properties. Additionally, phosphor can also be made into thin films or laminates using plastics such as polycarbonate, polypropylene, polyesters, and any other materials having similar properties. These films are flexible and can be shaped and contoured.

In the present invention any number of LED and phosphor combinations are used so long as the phosphor is activated, by the first radiation from LED 410, and then photoluminesces providing the second radiation.

In an example, when white light is desired, a suitable combination can be obtained using a blue LED with peak wavelength of 450–480 nm and a filter impregnated with a Cerium activated Yttrium Aluminum Garnet phosphor ($Y_3Al_5O_{12}:Ce^{3+}$). In furtherance of the example, modification to the composition of the phosphor can achieve a different second radiation, fine-tuning the second radiation as it were. For example, the addition of Gadolinium in place of a portion of the Yttrium will shift the peak emission slightly towards the red spectrum. Such compositions are presented as $(Y_{1-x},Gd_x)_3Al_5O_{12}:Ce^{3+}$, where 0 x<1. Additionally, by adding a coactivator Praseodymium, the second radiation will have two peaks, one around 570–580nm and the other at 610–620 nm. This phosphor is represented as $Y_3Al_5O_{12}:Ce^{3+},Pr^{3+}$.

Additionally, organic luminescent material may be utilized as well. In another example, when white light is desired, a suitable combination can be obtained using a blue LED with peak wavelength of 450–480 nm and a filter impregnated with a DCM (4-Dicyanmethylene-2-methyl-6 (p-dimethylaminostyryl)-4Hpyran), expressed chemically as $C_{19}H_{17}N_3$. Such an organic material is produced by Lambda Physik, Inc. of Fort Lauderdale, Fla.

By choosing suitable phosphors, different colors can be obtained. In one example, a Europium activated Strontium Thiogallate phosphor ($SrGa_2S_4:Eu^{2+}$) provides a peak emission of 510 to 530 nm. When such a phosphor impregnated filter is used with a blue LED, a green radiation is obtained.

In another example, Europium activated phosphors such as Strontium Sulfide ($SrS:Eu^2+$) or Calcium Strontium Sulfide [$(Ca,Sr)S:Eu^{2+}$] are utilized within phosphor impregnated layer 420. When such phosphors are used with a blue LED, a red radiation having a peak at 610 to 630 nm is obtained.

Additionally, combination of phosphors can be used. For example, the Europium activated Strontium Thiogallate phosphor ($SrGa_2S_4:Eu^2+$) can be combined with Strontium Sulfide ($SrS:Eu^{2+}$) or Calcium Strontium Sulfide [$(Ca,Sr)S:Eu^{2+}$] phosphors. These phosphor combinations, when utilized with a blue LED, result in a white radiation. The combination of the first blue radiation together with the second green radiation and the third red radiation determines the composite radiation. By using different mix ratios, by weight, between the phosphors, a variety of colors can be obtained.

In yet another embodiment and referred to above, the second radiation may be the only radiation desired to be emitted from phosphor impregnated layer 420. In this embodiment, the phosphor impregnated layer 420 can be fabricated such that it absorbs all of the first radiation and subsequently only the second radiation is emitted. In an example, an LED that emits ultra-violet (UV) wavelength radiation would utilize such a design as it is not desirous to have UV radiation in the composite radiation. In this example, light source 410 is implemented as ultra-violet (UV) light emitting diode (LED), an ultra-violet (UV) laser diode, and other similar light emitting devices.

Figure 5:
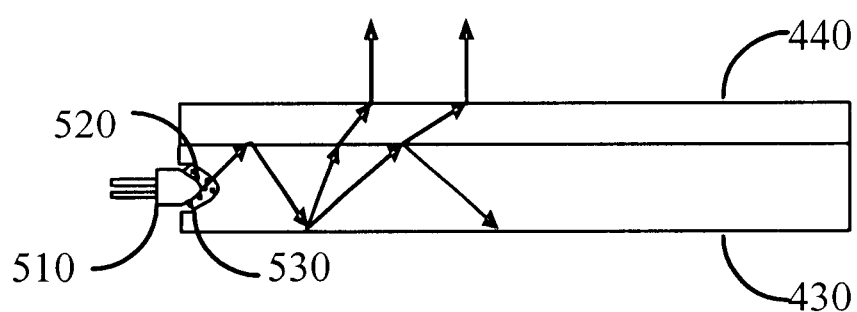
FIG. 5 is a schematic diagram illustrating a backlighting device according to another embodiment of the present invention.

FIG. 5 is a schematic diagram illustrating a backlighting device 500 according to another embodiment of the present invention. FIG. 5 details an embodiment of a system for producing a determined backlighting radiation, in accordance with the present invention. Backlighting device 500 includes a light source 510, a phosphor impregnated layer 520, a cavity 530, a light guide 430, and a legend 440. Like components from FIG. 4 are labeled and function identically.

In FIG. 5, light source 510, phosphor impregnated layer 520, and light guide 430 are physically coupled to enhance radiation transfer. In one embodiment, phosphor impregnated layer 520 is manufactured from a flexible and pliable material, such as, described above. In an example, phosphor impregnated layer 520 is further manufactured to conform to the shape of light source 510, such as, an LED. In this example, cavity 530, also referred to as a slot, is formed at the radiation receiving end of light guide 430 such that both phosphor impregnated layer 520 and light source 510 will fit securely in place with a suitable adhesive, such as, epoxy. The result then is a potentially higher radiation transfer thereby providing additional illumination to legend 440 and therefore to the backlighting device 500 as a whole.

The abovedescribed methods and implementation for providing backlighting utilizing a luminescent impregnated material are example methods and implementations. These methods and implementations illustrate one possible approach for providing backlighting utilizing a luminescent impregnated material. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

We claim:

1. A backlighting apparatus comprising:

a radiation source that provides a first radiation, wherein the radiation source is selected from a group consisting of a color light emitting diode, a color laser diode, a white light emitting diode, a white laser diode, an ultra violet light emitting diode, and an ultra violet laser diode;

a filter layer optically coupled to the radiation source, the filter layer including a luminescent material and designed to absorb the first radiation, in whole or in part, and emit an emitted radiation or a composite radiation;

a light guide optically coupled to the filter layer to receive the emitted radiation or composite radiation and to reflect at least a portion of the emitted radiation or composite radiation; and a display layer optically coupled to the light guide to receive the reflected radiation or composite radiation.

2. The backlighting apparatus of claim 1, wherein the radiation source is configured as a surface mountable package.

3. The backlighting apparatus of claim 1, wherein the filter layer enables the emitted radiation or composite radiation to be directed to at least one user determined location.

4. The backlighting apparatus of claim 1, wherein the luminescent material further comprises a blend of one or more phosphors.

5. The apparatus of claim 1, wherein the filter layer further comprises an optically clear substance, and the luminescent material is impregnated within the optically clear substance.

6. The apparatus of claim 5 wherein the optically clear substance comprises an optically clear polymer.

7. The apparatus of claim 1, wherein the filter layer further comprises an optically clear substance, and the luminescent material is layered on top of the optically clear substance.

8. The apparatus of claim 7 wherein the optically clear substance comprises an optically clear polymer.

9. The apparatus of claim 1, wherein the radiation source, the filter layer, and the light guide are optically coupled utilizing at least one surface mating profile and an optically clear adhesive.

10. A method for providing backlighting, comprising:

generating a first radiation by a radiation emitting device, wherein the radiation emitting device is selected from the group consisting of a color light emitting diode, a color laser diode, a white light emitting diode, a white laser diode, an ultra violet light emitting diode, and an ultra violet laser diode;

absorbing the first radiation, in whole or in part;

emitting an emitted radiation or composite radiation based on the absorbed first radiation into a light guide;

reflecting at least a portion of the emitted radiation or the composite radiation onto a display layer.

11. The method of claim 10, wherein absorbing the first radiation comprises:

receiving the first radiation into a filter layer; and reacting to the first radiation based on a luminescent material within the filter layer.

12. A backlighting apparatus, comprising:

a radiation source that provides a first radiation, wherein the radiation source is configured as a throughhole package;

a filter layer optically coupled to the radiation source, the filter layer including a luminescent material and designed to absorb the first radiation, in whole or in part, and emit an emitted radiation or a composite radiation;

a light guide optically coupled to the filter layer to receive the emitted radiation or composite radiation and to reflect at least a portion of the emitted radiation or composite radiation; and a display layer optically coupled to the light guide to receive the reflected radiation or composite radiation.

13. The backlighting apparatus of claim 12, wherein the radiation source is selected from a group comprising a color light emitting diode, a color laser diode, a white light emitting diode, a white laser diode, an ultra violet light emitting diode, and an ultra violet laser diode.

14. The backlighting apparatus of claim 12, wherein the filter layer enables the emitted radiation or composite radiation to be directed to at least one user determined location.

15. The backlighting apparatus of claim 12, wherein the luminescent material further comprises a blend of one or more phosphors.

16. The apparatus of claim 12, wherein the filter layer further comprises an optically clear substance, and the luminescent material is impregnated within the optically clear substance.

17. The apparatus of claim 16, wherein the optically clear substance comprises an optically clear polymer.

18. The apparatus of claim 12, wherein the filter layer further comprises an optically clear substance, and the luminescent material is layered on top of the optically clear substance.

19. The apparatus of claim 18, wherein the optically clear substance comprises an optically clear polymer.

20. The apparatus of claim 12, wherein the radiation source, the filter layer, and the light guide are optically coupled utilizing at least one surface mating profile and an optically clear adhesive.

\* \* \* \* \*